Patented Dec. 20, 1927.

1,653,008

UNITED STATES PATENT OFFICE.

IRVIN W. HUMPHREY, OF KENVIL, NEW JERSEY, ASSIGNOR TO HERCULES POWDER COMPANY, OF WILMINGTON, DELAWARE, A CORPORATION OF DELAWARE.

NITROCELLULOSE LACQUER AND PROCESS OF MAKING SAME.

No Drawing.    Application filed November 22, 1924.   Serial No. 751,682.

The object of my invention is to provide a nitrocellulose lacquer or varnish containing an ingredient having the property of dissolving gums and resins and which, therefore, may be used to advantage in lacquers and varnishes which contain both nitrocellulose and resins. Another object of my invention is to provide a nitrocellulose lacquer containing an ingredient which will serve to some extent as a substitute for castor oil and other substances which are used to produce films of high flexibility. Another object of the invention is to produce a nitrocellulose lacquer ingredient which may be used as a substitute, in whole or in part, for amyl acetate and which can be produced more cheaply, thereby effecting a saving in the cost of manufacturing the lacquer.

My invention comprises a solution with nitrocellulose of oxidized pine oil or of certain oxidized constituents of pine oil and the process of preparing the same, as hereinafter described.

Pine oil is known to be a complex mixture of different substances, including terpineol, methyl chavicol, borneol, fenchyl alcohol, terpene hydrocarbons and smaller amounts of several other bodies. Pine oil itself has no colloiding action upon nitrocotton, and its individual constituents also possess little colloiding power. However, certain of these constituents, notably borneol and fencyl alcohol, yield, on oxidation, the ketones camphor and fenchone respectively, the former being a well known colloiding agent for nitrocellulose.

Pine oil contains above five per cent of borneol, and approximately as much fenchyl alcohol. These two alcohols cannot be easily isolated from pine oil in a high degree of purity by means of fractionation because of the nearness of their boiling points with those of some of the other constituents of pine oil.

I have found that it is feasible to treat pine oil with certain oxidizing agents and obtain a liquid, which may be designated oxidized pine oil, which exhibits an excellent colloiding action on nitrocellulose. When pine oil is oxidized under proper conditions, it may contain approximately ten per cent of the ketones camphor and fenchone and, in addition, perhaps small amounts of other oxidized substances which colloid nitrocellulose. Another portion of the pine oil is oxidized to inert bodies, but the operation may be so conducted that a great portion of the pine oil remains unaltered, serving as a diluent to the active colloiding agents but possessing a strong solvent power for resins.

A solution of nitrocellulose may be prepared in straight oxidized pine oil, but on account of the rather high boiling range of oxidized pine oil, which is comparable to that of pine oil itself, it is usually desirable to add large proportions of lower boiling liquids. The latter may be either solvents or non-solvents for nitrocellulose. Examples of solvents are acetone and butyl acetate, and of non-solvents, alcohol and benzene. It is possible to incorporate a large proportion of a non-solvent in the vehicle without precipitating the nitrocellulose. Alcohol, even if it contains as much as five per cent of water, is found to be a desirable diluent from the standpoint of increasing the colloiding action of oxidized pine oil. Even if as much as several volumes of alcohol are added, the colloiding action of oxidized pine oil is accelerated to a remarkable degree.

Any good grade of pine oil will serve as the raw material for preparing oxidized pine oil, but it is preferable to use the portion distilling within the approximate range of 190–215° C. The higher and lower boiling portions of pine oil yield an oxidized pine oil which possesses inferior colloiding powers. Other sources of raw material are (1) the high boiling residue which remains on dehydrating pine oil to form hydrocarbons (turpentine substitute) and (2) the by-product oil which is obtained in preparing terpin hydrate from pine oil.

It may be desired to decrease the boiling range of the oxidized pine oil and thus increase its rate of evaporation from the nitrocellulose lacquer. This end can be attained by treating the oxidized pine oil with a dehydrator, such as approximately 2% of fuller's earth, which results in the conversion of about 60% of the oxidized pine oil into a lower boiling product (170–190° C.). If desired, the latter can be distilled off, leaving a residue (boiling range largely 195–235° C.) comprising about 35% of the original oxidized pine oil. This residue is a more active colloiding agent for nitrocellulose than the original oxidized pine oil, and may be employed alone as a nitrocellulose solvent, but is preferably diluted with the lower boiling product or with other lower boiling solvents or non-solvents.

Several oxidizing agents have been employed in preparing oxidized pine oil. Nitric acid is well adapted for used on a fraction of pine oil that is rich in fenchyl alcohol. Sodium or potassium bichromate, or chromic acid, is preferable in some respects to nitric acid, since the latter converts much of the pine oil into undesired products. I have employed other oxidizing agents such as chlorine, potassium permanganate and sodium hypochlorite, as well.

In a typical embodiment of my invention, the pine oil is treated with 4.2 times its weight of an oxidizing mixture consisting of 15% sodium bichromate, 20% of sulphuric acid of 66° Bé. and 65% of water, but different proportions of the oxidizing agent may be employed. Agitation is employed at a temperature of 21–32° C., with some cooling, since the reaction is exothermic, but the temperature may be allowed to rise somewhat higher. The crude oxidized oil is then refined by a steam distillation.

Oxidized pine oil will colloid as much as 10% of its weight of nitrocellulose. To this solution may be added several volumes of a lower boiling solvent or non-solvent diluent liquid. It is generally preferable, however, to have part or all of the diluents present when the nitrocellulose is being colloided. The solution may contain from one to ten per cent of oxidized pine oil, the amount naturally varying with the character of the other constituents and with the subsequent application of the solution of lacquer.

A nitrocellulose lacquer embodying my invention accomplishes the objects of my invention hereinbefore recited. That is, in those lacquers wherein oxidized pine oil may be substituted for amyl acetate or other solvent, or wherein it may be substituted for castor oil and other substances which are used to increase flexibility, the lacquer may be produced more economically; in other nitrocellulose lacquers or varnishes its capacity for dissolving gums and resins is of distinct value.

While in the claims I use the term "nitrocellulose lacquer", I do not mean that the term should be understood as restricting the claims to a lacquer containing resins, as oxidized pine oil is applicable as a nitrocellulose solvent either with or without resins being present in the solution.

In specifying pine oil and certain oxidized and non-oxidized constituents thereof, it should be understood that pine oil is not used in any generic sense that would include turpentine, which is not, in fact, an equivalent of pine oil, and differs therefrom radically in its physical properties and chemical composition. Turpentine, $C_{10}H_{16}$ is a hydrocarbon having a specific gravity of .86 and a boiling range (90%) of 155–170° C. Pine oil consists largely of alcohols, $C_{10}H_{17}OH$, its specific gravity is about .93, while approximately 90% distills between 190° and 225° C. While it is known that turpentine may be polymerized to give a nitrocellulose solvent, polymerized turpentine is entirely different from the product resulting from the oxidization of pine oil.

Having now fully described my invention, what I claim and desire to protect by Letters Patent is:

1. A nitrocellulose lacquer comprising a solution of nitrocellulose, a substance adapted to colloid nitrocellulose and a diluent, said colloiding substance comprising certain oxidized constituents of pine oil and said diluent comprising non-oxidized constituents of pine oil.

2. A nitrocellulose lacquer comprising a solution of nitrocellulose, camphor and crude fenchone, with pine oil constituents acting as a diluent.

3. A nitrocellulose lacquer comprising a solution of introcellulose and oxidized pine oil and a diluent having a substantially lower boiling range than the boiling range of the oxidized pine oil.

4. A nitrocellulose lacquer comprising a solution of nitrocellulose, camphor and crude fenchone and diluent liquids, one of which comprises pine oil constituents and another of which comprises a liquid of a substantially lower boiling range than that of camphor and fenchone.

5. The process of preparing a nitrocellulose lacquer which comprises treating pine oil with an agent effective to oxidize certain oxidizable constituents thereof so as to render them solvents for nitrocellulose, and forming a solution of said oxidized constituents with nitrocellulose.

6. The process of preparing a nitrocellulose lacquer which comprises treating pine oil with an agent effective to oxidize oxidizable constituents thereof so as to render them solvents for nitrocellulose, and forming a solution of the treated pine oil, composed of said oxidizable constituents and diluents, with nitrocellulose.

7. The process of preparing a nitrocellulose lacquer which comprises separating from pine oil constituents thereof including borneol and fenchyl alcohol, treating said constituents with an agent effective to oxidize the borneol and fenchyl alcohol, and forming a solution of said treated pine oil constituents with nitrocellulose.

8. The process of preparing a nitrocellulose lacquer which comprises separating from pine oil the portion distilling within the approximate range 190–215° C., treating said separated portion with an agent effective to oxidize certain oxidizable constituents of said extracted portion, thereby providing a nitrocellulose lacquer ingredient composed of nitrocellulose solvent and diluents, and forming a solution of said ingredient with nitrocellulose.

9. The process of preparing a nitrocellulose lacquer which comprises treating pine oil with an agent effective to oxidize oxidizable constituents thereof so as to render them solvents for nitrocellulose, and forming a solution of the treated pine oil with nitrocellulose and a diluent liquid having a substantially lower boiling range than the boiling range of said oxidizable constituents.

10. A nitrocellulose lacquer comprising a solution of nitrocellulose and oxidized pine oil constituents comprising one or more oxidation products having a boiling point or points between 190° C. and 215° C. and having a substantial colloiding action on nitrocellulose.

11. A nitrocellulose lacquer comprising a solution of nitrocellulose and oxidized pine oil constituents comprising camphor and crude fenchone.

In testimony of which invention, I have hereunto set my hand, at Kenvil, N. J., on this 19th day of November, 1924.

IRVIN W. HUMPHREY.